US007920276B2

(12) United States Patent
Braiman et al.

(10) Patent No.: US 7,920,276 B2
(45) Date of Patent: Apr. 5, 2011

(54) TRACKING SYSTEM USING FIXED OPTICAL RADIATORS (75) Inventors: Michael Braiman, Petah Tikva (IL); Rom Eizenberg, Herzlia (IL); Itai Efrat, Givatayim (IL)

(73) Assignee: Precyse Technologies, Inc., Atlanta, GA (US)

( * ) Notice: Subject to any disclaimer, the term of this patent is extended or adjusted under 35 U.S.C. 154(b) by 411 days.

(21) Appl. No.: 11/574,381

(22) PCT Filed: Jun. 15, 2005

(86) PCT No.: PCT/IL2005/000629
§ 371 (c)(1),
(2), (4) Date: Feb. 27, 2007

(87) PCT Pub. No.: WO2005/124476
PCT Pub. Date: Dec. 29, 2005

(65) Prior Publication Data
US 2007/0269177 A1    Nov. 22, 2007

(30) Foreign Application Priority Data
Jun. 17, 2004   (IL) .......................................... 162612

(51) Int. Cl.
*G01B 11/14*    (2006.01)
(52) U.S. Cl. ........................................ 356/614; 356/622
(58) Field of Classification Search .................. 356/4.01, 356/614, 622; 382/103, 106, 107
See application file for complete search history.

(56) References Cited

U.S. PATENT DOCUMENTS

| 4,272,783 | A | 6/1981 | Warnstam et al. |
| 5,590,059 | A | 12/1996 | Schier |
| 6,079,862 | A | 6/2000 | Kawashima et al. |
| 7,456,742 | B2 * | 11/2008 | Cato .......................... 340/568.5 |
| 2002/0101197 | A1 * | 8/2002 | Lys et al. ...................... 315/291 |

(Continued)

FOREIGN PATENT DOCUMENTS
JP    02002213920 A  *  7/2002
(Continued)

OTHER PUBLICATIONS
International Search Report published Feb. 9, 2006 for PCT/IL05/00629 filed Jun. 15, 2005.
(Continued)

*Primary Examiner* — Tarifur Chowdhury
*Assistant Examiner* — Tara S Pajoohi
(74) *Attorney, Agent, or Firm* — Duane Morris LLP (57) ABSTRACT

Apparatus for tracking an object (12A, 12B, 12C) including radiator modules (16A, 16B, 16C), disposed in an array of known locations adjoining a region (13) in which the object moves; each module includes at least one emitter (44, 46, 48) which emits a respective color selected from among a first plurality of colors. The apparatus includes a controller (32), which drives the at least one emitter to emit during a respective time slot, selected from among a second plurality of time slots during which the modules may emit. The apparatus also includes a location unit (22), fixed to the object and including at least one camera (72), which captures a sequence of electronic images containing some of the locations of the modules. The apparatus further includes a processing unit (26), which processes the electronic images to determine, responsively to the colors emitted by the modules and the time slots in which the colors are emitted, a location of the object.

30 Claims, 3 Drawing Sheets

U.S. PATENT DOCUMENTS

2004/0202351 A1* 10/2004 Park et al. ..................... 382/104

FOREIGN PATENT DOCUMENTS

| WO | WO9609918 | A1 | 4/1996 |
| WO | WO9700454 | A1 | 3/1997 |
| WO | WO03000367 | A1 | 3/2003 |
| WO | WO03002942 | A1 | 9/2003 |

OTHER PUBLICATIONS

Written Opinion published Dec. 17, 2006 for PCT/IL05/00629 filed Jun. 15, 2005.

International Preliminary Report on Patentability published Dec. 20, 2006 for PCT/IL05/00629 filed Jun. 15, 2005.

* cited by examiner

TRACKING SYSTEM USING FIXED OPTICAL RADIATORS

FIELD OF THE INVENTION

The present invention relates generally to object location systems, and specifically to optical systems for tracking one or more movable objects.

BACKGROUND OF THE INVENTION

Various methods are known in the art for remote tracking of a movable object within a controlled area. For example, radio frequency (RF) identification tags may be fixed to objects in the area. Each tag typically comprises an RF transceiver, which transmits a unique identification code when queried by a signal from a central antenna. Such systems may be capable of identifying multiple objects, but they generally give only a rough indication of the location of each object. Optical markers can be tracked using video cameras to obtain more accurate position information. Optical systems of this sort, however, generally require the use of sophisticated and costly image processing equipment, and are limited in the number of objects that they can track simultaneously.

SUMMARY OF THE INVENTION

In embodiments of the present invention, a location system tracks, within a defined region, an object which is able to move. A plurality of optical radiator modules are fixedly located so as to radiate optical radiation into the region. Each module is programmed to emit optical radiation of a certain color during a predetermined time slot, among a number of different colors and a plurality of synchronized time slots that are available. An optical location unit is fixed to the object, the unit comprising at least one camera which captures a sequence of electronic images of a region wherein the modules are fixed, so as to image at least two of the modules. A processing unit processes the images and identifies the imaged modules from their color and time slot. The unit determines a location of the object by comparing the imaged positions of the identified modules with known fixed locations of the modules. In a similar manner, by fixing a respective optical location unit to other objects, the location system is able to track a substantially unlimited number of such objects as they move within the region, using a relatively small number of radiator modules.

Typically, the optical location unit for the object is configured, and the radiator modules are located, so that the images formed by the unit comprise at least three modules.

There is therefore provided, according to an embodiment of the present invention, apparatus for tracking an object, including:

a multiplicity of optical radiator modules, disposed in an array of known locations adjoining a region in which the object is to move, each module including:

at least one optical emitter, which is adapted to emit optical radiation of a respective color, selected from among a first plurality of colors emittable by the modules; and a controller, which is coupled to drive the at least one optical emitter to emit the optical radiation during a respective time slot, selected from among a second plurality of time slots during which the modules may emit the optical radiation;

an optical location unit, adapted to be fixed to the object and comprising at least one camera, which is adapted to capture a sequence of electronic images containing at least some of the locations of the modules; and a processing unit, which is adapted to process the electronic images in the sequence in order to determine, responsively to the colors of the optical radiation emitted by the modules and the time slots in which the optical radiation is emitted, a location of the object.

The processing unit may transmit signals to the optical radiator modules which determine the respective color and the respective time slot of each of the modules, and which synchronize the time slots, and the signals may determine that the respective color and the respective time slot form a unique combination for each of the modules. The processing unit may transmit the signals to the optical location unit so as to synchronize the time slots with the sequence of electronic images. The signals may consist of a radio frequency (RF) signal, and may include a synchronization signal chosen from at least one of an infrared (IR) synchronization signal, a cellular communication network synchronization beacon, and a Global Positioning System (GPS) synchronization beacon.

Typically, the location of the object includes a locus of possible locations of the object, and the processing unit is adapted to determine the locus in response to the at least some locations of the modules.

In an aspect of the invention, the at least some of the locations of the modules include two locations of the modules, and the processing unit applies one or more limiting regions for the object so as to determine the location of the object as a unique location.

Typically, the at least some of the locations of the modules consists of three locations of the modules, the location of the object is a unique location, the unique location is a unique intersection of three loci of possible locations of the object, and the processing unit is adapted to determine the three loci in response to the three locations of the modules.

In some embodiments, the optical location unit includes a microprocessor which performs an initial processing of the sequence of electronic images so as to determine pixel coordinates of the at least some locations of the modules, the optical location unit conveys the pixel coordinates to the processing unit, and the processing unit processes the pixel coordinates to determine the location of the object.

In a disclosed embodiment, for each module, the at least one optical emitter includes at least first and second optical emitters of different, first and second colors, and the controller is configurable to select one of the first and second colors to be emitted by the module.

Typically, the region includes a ceiling and at least one wall, and the multiplicity of modules are fixed to at least one of the ceiling and the at least one wall, and are configured to radiate the optical radiation into the region.

Typically, the at least one optical emitter includes at least one light-emitting diode (LED).

Typically, the processing unit is coupled to a memory, and is adapted to create a tracking database in the memory containing records of the location of the object in the region.

In an aspect of the invention, the optical location unit is fixed to the object so that the at least one camera is in a predetermined direction on capturing the sequence of electronic images.

There is further provided, according to an embodiment of the present invention, a method for tracking an object, including:

disposing a multiplicity of optical radiator modules in an array of known locations adjoining a region in which the object is to move, each module including:

at least one optical emitter, which is adapted to emit optical radiation of a respective color, selected from among a first plurality of colors emittable by the modules, and a controller, which is coupled to drive the at least one optical emitter to emit the optical radiation during a respective time slot, selected from among a second plurality of time slots during which the modules may emit the optical radiation;

fixing an optical location unit including at least one camera to the object;

capturing from the at least one camera a sequence of electronic images containing at least some of the locations of the modules; and processing the electronic images in the sequence in order to determine, responsively to the colors of the optical radiation emitted by the modules and the time slots in which the optical radiation is emitted, a location of the object.

Typically, the method also includes transmitting signals to the optical radiator modules which determine the respective color and the respective time slot of each of the modules, and which synchronize the time slots. The signals typically determine that the respective color and the respective time slot form a unique combination for each of the modules. The method may also include transmitting the signals to the optical location unit so as to synchronize the time slots with the sequence of electronic images, and the signals are typically radio frequency (RF) signals.

In an aspect of the invention, the signals include a synchronization signal chosen from at least one of infrared (IR) synchronization signal, a cellular communication network synchronization beacon, and a Global Positioning System (GPS) synchronization beacon.

In one embodiment, the location of the object includes a locus of possible locations of the object, and determining the location of the object includes determining the locus in response to the at least some locations of the modules.

Typically, the at least some of the locations of the modules includes two locations of the modules, and the method includes applying one or more limiting regions for the object so as to determine the location of the object as a unique location.

In an aspect of the invention, the at least some of the locations of the modules includes three locations of the modules, and the location of the object includes a unique location. The unique location typically includes a unique intersection of three loci of possible locations of the object, and the method includes determining the three loci in response to the three locations of the modules.

Typically, the optical location unit includes a microprocessor which performs an initial processing of the sequence of electronic images so as to determine pixel coordinates of the at least some locations of the modules, and processing the electronic images includes processing the pixel coordinates to determine the location of the object.

In one embodiment, for each module, the at least one optical emitter includes at least first and second optical emitters of different, first and second colors, and the controller is configurable to select one of the first and second colors to be emitted by the module.

In an aspect of the invention, the region includes at least one of a ceiling and at least one wall, and the multiplicity of modules are fixed to at least one of the ceiling and the at least one wall, and are configured to radiate the optical radiation into the region.

Typically, the at least one optical emitter includes at least one light-emitting diode (LED).

Processing the electronic images typically includes creating a tracking database in a memory containing records of the location of the object in the region.

In an aspect of the invention, fixing the optical location unit to the object includes fixing the unit so that the at least one camera is in a predetermined direction on capturing the sequence of electronic images.

The present invention will be more fully understood from the following detailed description of the embodiments thereof, taken together with the drawings, a brief description of which follows.

DETAILED DESCRIPTION OF EMBODIMENTS

Figure 1:
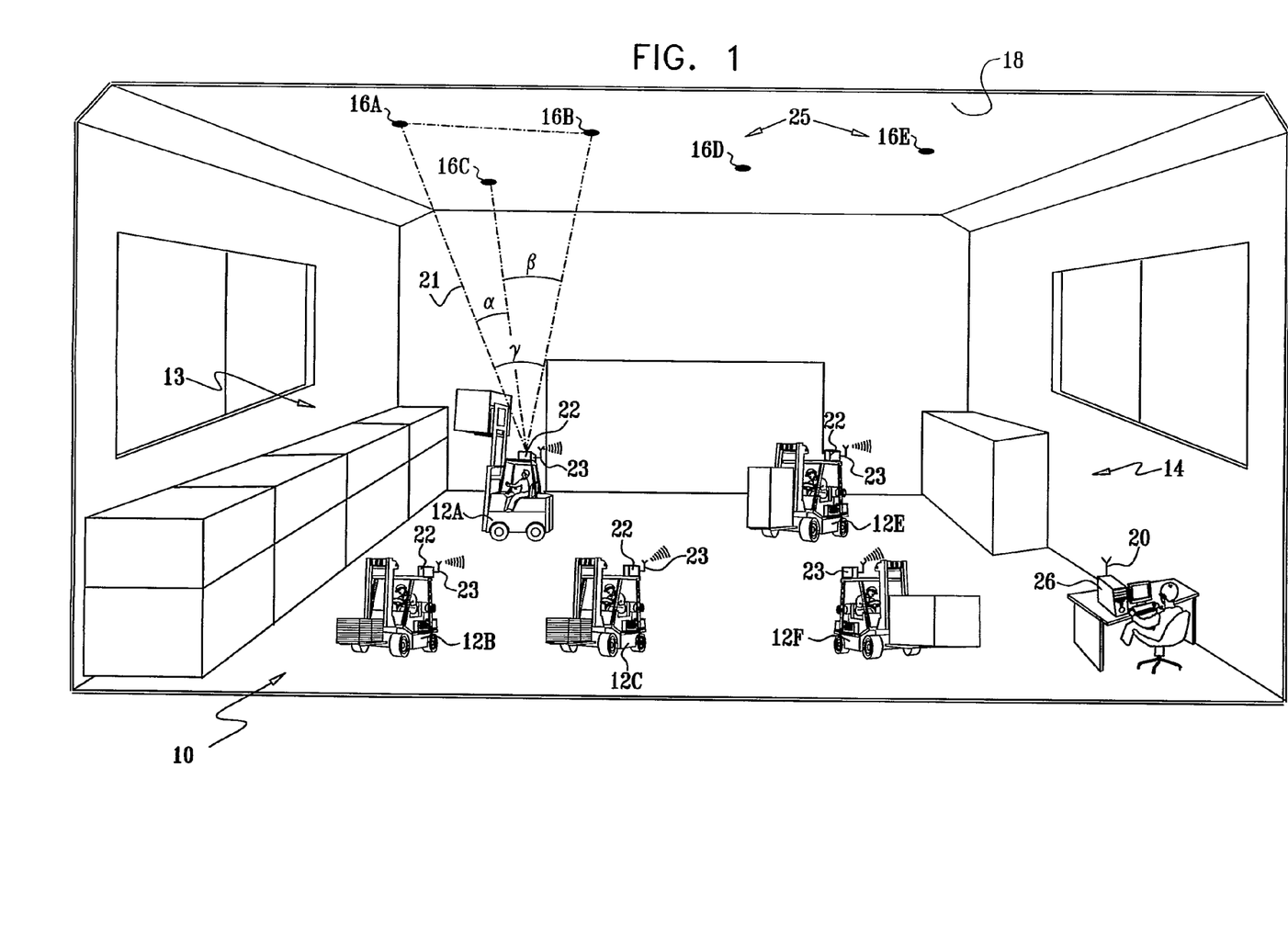
FIG. 1 is a schematic, pictorial illustration of a system for tracking movable objects within a region, according to an embodiment of the present invention.

Reference is now made to FIG. 1 which is a schematic, pictorial illustration of a system 10 for tracking movable objects 12A, 12B, 12C, . . . , within a region 13, according to an embodiment of the present invention. Objects 12A, 12B, 12C, . . . are also generically referred to hereinbelow as objects 12. As an example, region 13 is assumed to comprise a warehouse 14 having horizontal dimensions of the order of 50 m×100 m, and a height of the order of 5 m, and objects 12 are assumed to comprise forklift trucks that move within the warehouse. It will be appreciated, however, that this application of the present invention is given solely by way of example, and the principles of system 10 may be applied to tracking other movable objects, including people and animals, within a defined region. An optical location unit 22 is mounted on each object 12.

Substantially similar optical radiator modules 16A, 16B, 16C, . . . are fixed to a ceiling 18 of warehouse 14, or to one or more fixtures attached to the ceiling, so that the modules radiate optical radiation in a generally unobstructed downward direction. Modules 16A, 16B, 16C, . . . are also generically referred to hereinbelow as modules 16. The actual spacing and method of distribution of modules 16 is dependent on the mounting height of the modules, on the height and the field of view of the optical location units 22, and on the resolution required of system 10. Modules 16 and optical location units 22 are described in more detail below.

All modules 16 and optical location units 22 operate in mutual synchronization with a system clock, in accordance with radio frequency (RF) system synchronization signals broadcast by an antenna 20, from a central system control and processing unit 26 generating the system clock. Modules 16 each comprise an antenna module 25, and units 22 each comprise an antenna 23, the antenna modules and antennas 23 communicating with antenna 20, as described in more detail below. Unit 26 is typically located within warehouse 14.

Typically, antenna 20 transmits the system synchronization signals at approximately 433 MHz in the ISM band, with 1.5 MHz bandwidth. Alternatively, antenna 20 may transmit in the 846 MHz band, or in any other suitable band permitted by regulatory authorities. Further alternatively, system 10 may use optical system synchronization signals, such as infrared (IR) pulses transmitted by a suitable IR transmitter in place of antenna 20.

As yet another alternative, modules 16, optical location units 22, and/or the system clock may synchronize on an external signal, such as a beacon provided by a cellular communication network or a Global Positioning System (GPS).

In response to the system synchronization signal, each module 16 transmits radiation of an assigned color in an assigned time slot. Each module is programmed in advance with its time slot and color assignment, so that the combination of time slot and color is unique for each module. For example, if there are 150 modules 16, each module may be programmed to transmit in one of 50 successive time slots, each typically of the order of 200 msec long, during which the module emits either red, green or blue light. Alternatively, there may be a larger or smaller number of available time slots, which may be longer or shorter in duration, and a larger or smaller number of colors may be used. Further alternatively, modules 16 may be configured to emit IR or ultraviolet (UV) radiation. The term "optical radiation," as used in the present patent application and in the claims, should thus be understood to refer to any radiation in the visible, IR or UV range, while the term "color" refers to any distinguishable wavelength band in any of these ranges.

Each optical location unit 22 generates images of radiating modules 16 within a field of view of the unit. The images are analyzed to identify which modules 16 are present in the image, based on the time slot and color combination of each of the modules. The images are also analyzed to determine angles subtended at each object 12 by pairs of identified modules 16 present in the images. By way of example, modules 16A, 16B, and 16C are assumed to be present in the field of view of the unit 22 on object 12A, and the modules are determined to subtend angles $\alpha$, $\beta$, and $\gamma$ at the object. Angle $\gamma$ corresponds to a base angle of a triangle 21 formed by modules 16A, 16B, and object 12A.

As is also described in more detail below, processing unit 26 uses the subtended angles, and knowledge of the spatial distribution of modules 16A, 16B, and 16C, to determine a location of object 12A. Unit 26 applies the same location determination process individually to each of the objects 12 present in warehouse 14, so that it will be appreciated that there is substantially no limit to the number of objects 12 that may be tracked.

Figure 2:
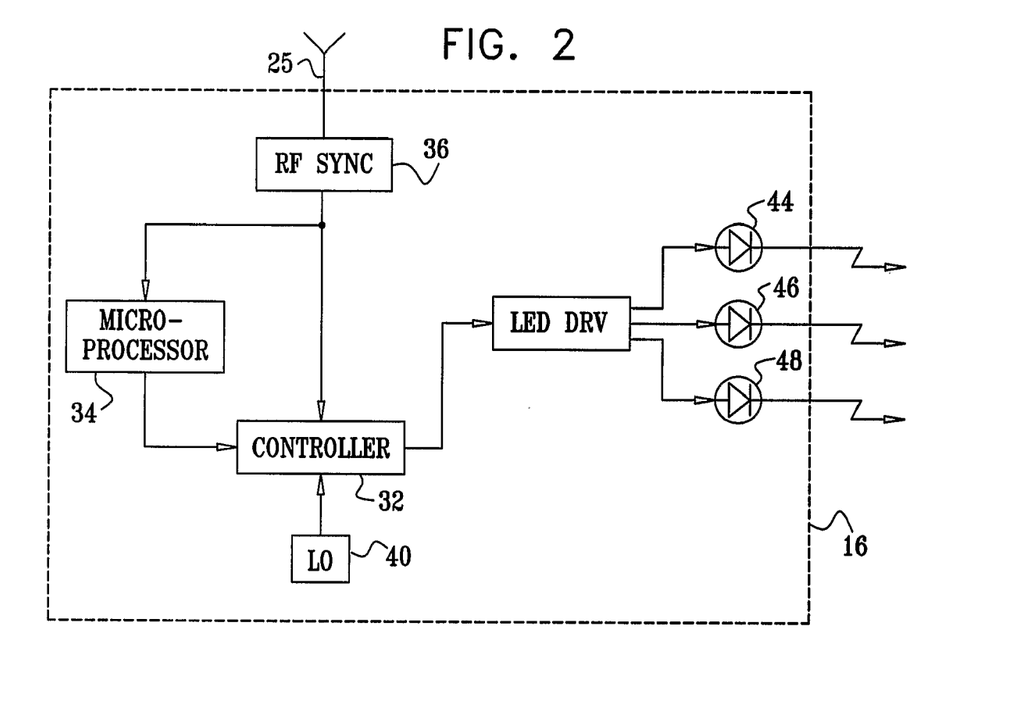
FIG. 2 is a block diagram that schematically shows details of an optical radiator module used in the system of FIG. 1, according to an embodiment of the present invention.

FIG. 2 is a block diagram that schematically shows details of module 16, according to an embodiment of the present invention. A controller 32 determines the color and time slot in which module 16 is to emit radiation, wherein the time slot is determined in relation to the system synchronization signals transmitted by antenna 20. The time slot and color assignments of module 16, and possibly other configurable operating parameters as well, are input to controller 32 via a microprocessor 34.

Operating power for the components of module 16 is typically supplied by line power, although power may alternatively be supplied by other means known in the art, such as a battery. The components of the module may be integrated into a single microelectronic chip. Alternatively, module 16 may comprise a circuit board or other substrate on which two or more chips are mounted.

An RF synchronization module 36 receives the system synchronization signals from antenna 20 via antenna module 25. Based on these signals, synchronization module 36 generates a synchronization input to controller 32. Typically, the system synchronization signal transmitted by antenna 20 comprises a pulse or a train of pulses in a predetermined pattern, indicating the beginning of a global synchronization period (GSP) for all of modules 16. (Different pulse trains may also be used to encode data representing the current time slot number.) Synchronization module 36 filters, amplifies and discriminates the RF signals received by antenna module 25 in order to detect the pulse or pattern of pulses transmitted by antenna 20. When the system synchronization signal comprises a pulse train (for synchronization purposes and possibly to represent the current time slot number), module 36 correlates the pattern of received pulses with a predetermined reference pattern in order to detect the exact synchronization, and accordingly signals the beginning of the GSP to controller 32. It is generally desirable that synchronization modules 36 in all of optical modules 16 synchronize on the signals from antenna 20 with a maximum module-to-module deviation no greater than $\frac{1}{10}$ of a time slot.

Controller 32 uses a clock provided by a local oscillator 40 in order to determine when its assigned time slot occurs within the GSP, relative to the synchronization input from module 36.

When the assigned time slot arrives, controller 32 triggers a LED driver circuit 42 to actuate one of LEDs 44, 46 and 48. Typically, each of the LEDs emits radiation of a different color. For example, LED 44 may emit red light, LED 46 green light, and LED 48 blue light. The choice of which LED to actuate is typically pre-programmed via microprocessor 34, so that no more than one module 16 emits radiation of a given color during any given time slot. Alternatively or additionally, system 10 may comprise different groups of modules 16, wherein each module has a single LED, and a different color LED is used in the modules of each group. Further alternatively, other types of variable-wavelength or fixed-wavelength light sources may be used.

Microprocessor 34 receives control signals from central unit 26 via antenna 20, antenna module 25 and RF module 36. The microprocessor uses the control signals to program controller 32, and to configure the timing parameters of each module 16, including:

The GSP duration (typically between 20 seconds and 8 minutes).

Time slot duration (typically between 100 msec and 1 sec).

Time slot selection (typically from time slot #1 to #50).

As noted above, microprocessor 34 may also be used to set other operating parameters of module 16, such as color selection. Although certain ranges of GSP and time slot duration are listed above by way of example, larger or smaller durations may also be used.

Figure 3:
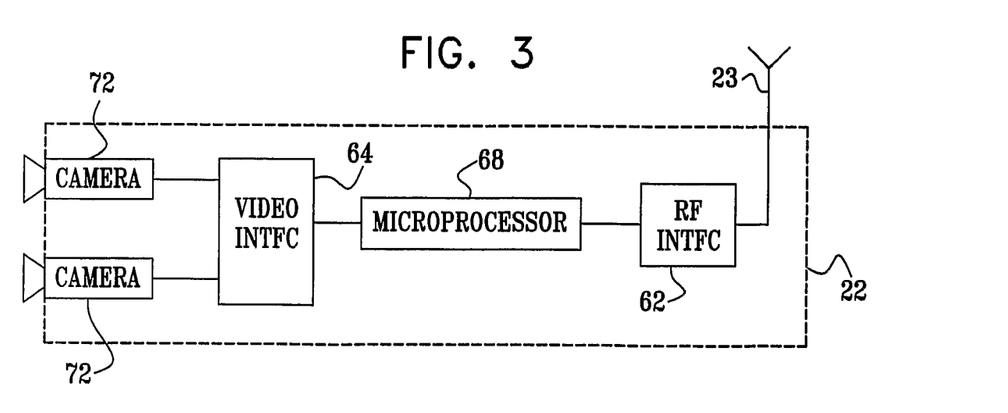
FIG. 3 is a block diagram that schematically shows details of an optical location unit used in the system of FIG. 1, according to an embodiment of the present invention.

FIG. 3 is a block diagram that schematically shows details of optical location unit 22, according to an embodiment of the present invention. Each unit 22 comprises one or more video cameras 72, and the units are mounted on objects 12 so that the one or more video cameras 72 point in a generally upward direction, towards ceiling 18. Typically, cameras 72 comprise standard CCD- or CMOS-based solid state image sensors, depending on the resolution required of system 10. For example, cameras 72 may comprise model CV7017H CCD cameras, produced by Appro Technologies (Taiwan), typically having, for a lens of focal length 2.5 mm, a generally rectangular field of view of 90°×120°. It will be appreciated that the field of view may be made larger or smaller than that given here, by respectively using a shorter or longer focal length lens.

Each video camera 72 operates at a standard rate, typically approximately 25 frames/second, and is synchronized to the system clock by a frame synchronization signal received from a video interface 64, such as the PV 143 WDM video capture card, produced by Professional Video (Taiwan). The frame synchronization signal is generated from the system synchronizing signal received from unit 26, via an antenna 23, an RF interface 62, and a microprocessor 68. Video interface 64 also acts as a frame grabber, receiving and digitizing inputs from cameras 72, and conveying its digital output to microprocessor 68 for analysis.

Microprocessor 68 processes the digitized video image output from each of cameras 72 in turn, in order to determine the coordinates of the pixel (or group of pixels) associated with the bright, colored lights of different modules 16 during successive time slots. For each optical location unit 22, the pixel coordinates and their color values are transmitted from microprocessor 68 via interface 62 and antenna 23, to central unit 26.

Figure 4:
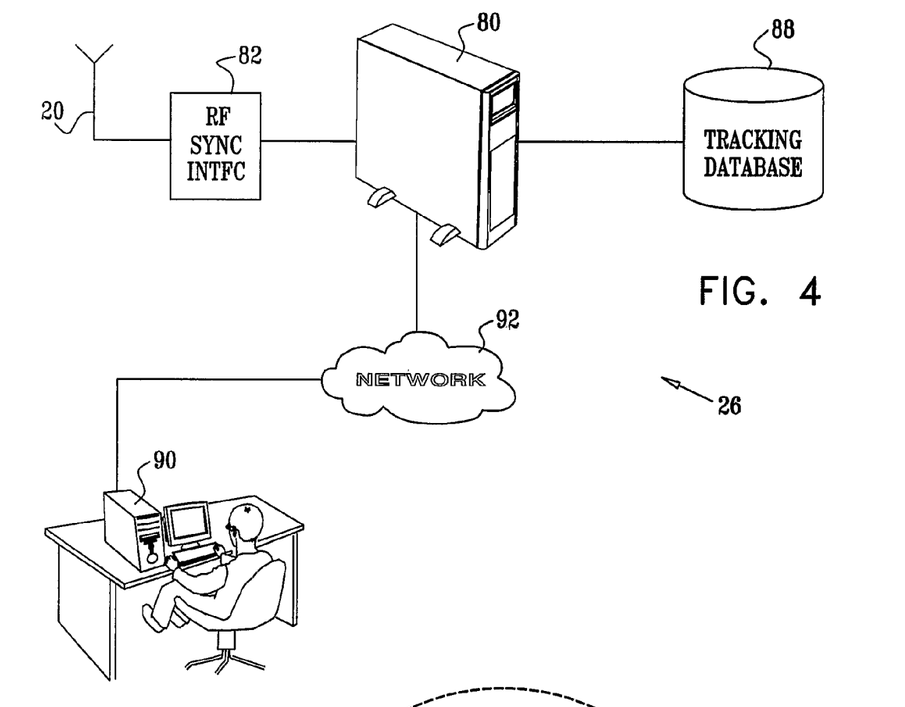
FIG. 4 is a block diagram that schematically shows details of a central processing and control unit of the system of FIG. 1, according to an embodiment of the present invention.

FIG. 4 is a block diagram that schematically shows details of central processing and control unit 26, according to an embodiment of the present invention. Unit 26 is built around a server 80, which typically comprises a personal computer running the Microsoft Windows® operating system. Server 80 controls an RF synchronization interface 82, comprising an RF transmitter, which transmits the RF synchronization signals via antenna 20, as described above.

Server 80 receives the pixel coordinates and color values from each unit 22, and compares the times and the color values received with stored values of time slots and colors emitted by modules 16. Thus, when server 80 finds that radiation of a particular color was detected in the image received by a specific optical unit 22 during a particular time slot, the server is able to determine unequivocally the identity of the module that emitted the radiation to the specific unit. Server 80 records the module identity, the pixel or group of pixel coordinates associated with the module, and an identity of the specific unit, in a tracking database 88, which is typically held in disk memory.

For each camera 72, from a knowledge of the focal length and possibly other parameters of the camera, and from the pixel coordinates of the images of the modules, server 80 determines an angle subtended at the respective optical location unit 22 by each pair of different modules 16 imaged by the camera. Alternatively, server 80 determines the angle subtended from the pixel coordinates of the module pairs by pre-calibrating the one or more cameras 72 comprised in each optical location unit 22.

Locations of modules 16 are registered in database 88, so that server 80 is able to determine a distance between each pair of modules 16. For each pair of the modules imaged by a specific optical location unit 22, server 80 is able to associate the distance between the pair with the angle subtended by the pair at the unit. Server 80 is thus able to determine a locus of regions where the object 12, onto which the specific optical location unit 22 is mounted, may be. In an embodiment of the present invention, and as is described in more detail below, by using a multiplicity of different pairs of imaged modules 16, server 80 determines a corresponding multiplicity of loci, and finds a unique value for the location of the object 12 from the intersection of the loci. The locations of each object 12 are stored in database 88.

It will be appreciated that the distribution between the microprocessors 68 of units 22 and server 80, of the computation to find the locations of each object, is described hereinabove by way of example, and other distributions are possible. For example, if a specific unit 22 is given the locations of modules 16, then the microprocessor 68 of the specific unit may determine the location of the object 12 on which the unit is mounted, and transmit the location to server 80. Other computation distributions will be apparent to those skilled in the art, and all are to be assumed as comprised within the scope of the present invention.

Users of system 10 may access the information in database 88 via server 80. The server may have a communication interface to a network 92, allowing a client computer 90 to access the information remotely, via the network. The information in database 88 indicates to the user which objects 12 were located in region 13 of system 10 at any point in time, and also provides a record of the locations and movements of the objects within the region. The user may similarly access server 80 in order to find the current locations of particular objects 12 in real time.

Figure 5:
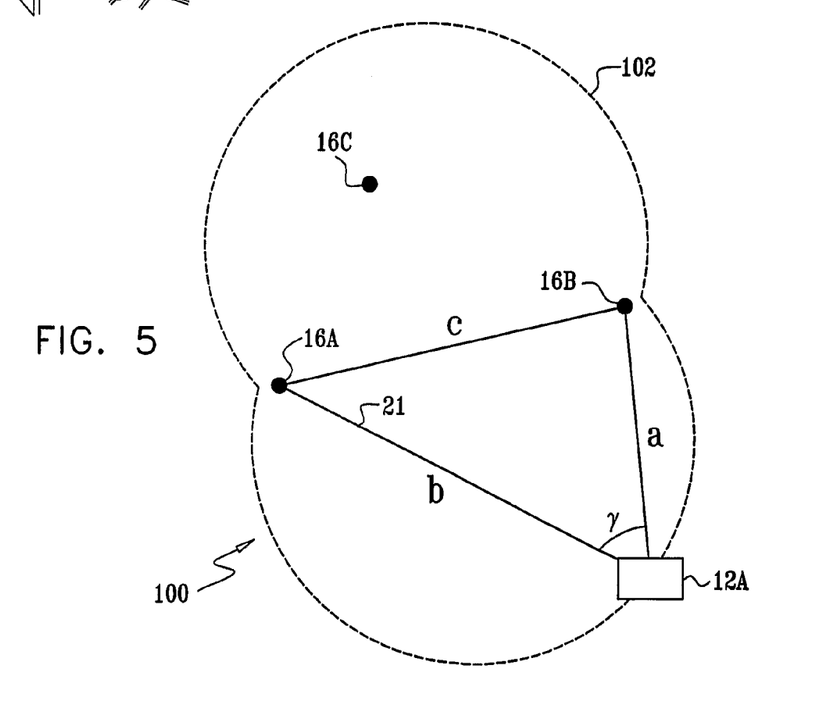
FIG. 5 is a schematic illustration of a locus of regions generated in the system of FIG. 1, according to an embodiment of the present invention.

FIG. 5 is a schematic illustration 100 of a locus 102 of regions generated in system 10, according to an embodiment of the present invention. Illustration 100 corresponds to a top view of a section of system 10, through ceiling 18, and depicts modules 16A and 16B and object 12A forming triangle 21 (FIG. 1). Triangle 21 has sides of length a, b, and c; c is the distance between modules 16A and 16B, and the angle γ is formed between sides a and b. a, b, c and γ are related by equation (1):

$$c^2 = a^2 + b^2 - 2ab \cos \gamma \qquad (1)$$

For a given c and angle γ, a locus 102 of regions exists, corresponding to different possible values of sides a and b. Thus, object 12A is located on locus 102. To determine a unique location for object 12A, server 80 typically uses one or more other pairs of modules 16 imaged by the unit 22 of the object, to determine respective loci of the one or more other pairs, and finds a unique intersection of the loci. Typically, modules 16 are arranged on ceiling 18 so that three or more pairs of modules are imaged by each unit 22, so that three or more loci may be used to determine the unique location of the unit. Alternatively, other methods for determining the unique location of object 12A within locus 102 may be used, such as storing in database 88 certain limiting sections of region 13 that are or are not accessible to object 12A. For example, if object 12A is only able to move on relatively narrow aisles within region 13, the paths of the aisles may be stored and used to determine the unique location of the object within locus 102.

It will be appreciated that the principles of the present invention may be applied to tracking the positions of movable objects within substantially any region that may be illuminated by optical radiator modules such as modules 16, and that the objects may be able to move, and may be tracked in, one, two, or three dimensions. It will be further appreciated that the optical radiator modules may be fixed to any suitable location, such as on walls outside, surrounding and/or within the region wherein the objects are being tracked.

In an alternative embodiment of the present invention, units 22 are fixed on respective objects 12 so that a direction of the one or more cameras within the units is predetermined when the units image modules 16. Each imaged module 16 then defines a locus for the unit which forms the image. For example, units 22 may be fixed to objects 12 to point in an upward vertical direction. An elevation angle of an imaged module may then be calculated from the pixel coordinates of the image, and a locus—typically a circle—for the unit determined. A unique location for the unit may then be found by determining intersections of loci, typically intersections of three loci. Alternatively, other methods for determining the unique location on one locus, substantially as described above, may be used. All such methods for determining a unique location of the unit, using cameras which are mounted so as to have a predetermined direction, are assumed to be comprised within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. Apparatus for tracking an object, comprising:
   a. a multiplicity of optical radiator modules, disposed in an array of known locations adjoining a region in which the object is to move, each module comprising:
      i. at least one optical emitter, which is structured to emit optical radiation of a respective color, selected from among a first plurality of colors emittable by the modules;
      ii. and a controller, which is coupled to drive the at least one optical emitter to emit the optical radiation during a respective time slot, selected from among a second plurality of time slots during which the modules may emit the optical radiation, such that the respective color and the respective time slot form a unique combination for each of the modules;
   b. an optical location unit, structured to be fixed to the object and comprising at least one camera, which is arranged to capture a sequence of electronic images containing at least some of the locations of the modules;
   c. and a processing unit, which is configured to process the electronic images in the sequence in order to determine, responsively to the colors of the optical radiation emitted by the modules and the time slots in which the optical radiation is emitted, a location of the object.

2. The apparatus according to claim 1, wherein the location of the object comprises a locus of possible locations of the object, and wherein the processing unit is configured to determine the locus in response to the at least some locations of the modules.

3. The apparatus according to claim 1, wherein the at least some of the locations of the modules comprises two locations of the modules, and wherein the processing unit is configured to apply one or more limiting regions for the object so as to determine the location of the object as a unique location.

4. The apparatus according to claim 1, wherein the optical location unit comprises a microprocessor which is programmed to perform an initial processing of the sequence of electronic images so as to determine pixel coordinates of the at least some locations of the modules, wherein the optical location unit is programmed to convey the pixel coordinates to the processing unit, and wherein the processing unit is programmed to process the pixel coordinates to determine the location of the object.

5. The apparatus according to claim 1, wherein for each module, the at least one optical emitter comprises at least first and second optical emitters of different, first and second colors, and wherein the controller is configurable to select one of the first and second colors to be emitted by the module.

6. The apparatus according to claim 1, wherein the region comprises at least one of a ceiling and at least one wall, and wherein the multiplicity of modules are fixed to at least one of the ceiling and the at least one wall, and are configured to radiate the optical radiation into the region.

7. The apparatus according to claim 1, wherein the at least one optical emitter comprises at least one light-emitting diode (LED).

8. The apparatus according to claim 1, wherein the processing unit is coupled to a memory, and wherein the processing unit is configured to create a tracking database in the memory containing records of the location of the object in the region.

9. The apparatus according to claim 1, wherein the optical location unit is fixed to the object so that the at least one camera is in a predetermined direction on capturing the sequence of electronic images.

10. The apparatus according to claim 1, wherein the processing unit transmits signals to the optical radiator modules which determine the respective color and the respective time slot of each of the modules, and which synchronize the time slots.

11. The apparatus according to claim 10, wherein the processing unit transmits the signals to the optical location unit so as to synchronize the time slots with the sequence of electronic images.

12. The apparatus according to claim 10, wherein the signals comprise a radio frequency (RF) signal.

13. The apparatus according to claim 10, wherein the signals comprise a Global Positioning System (GPS) synchronization beacon.

14. The apparatus according to claim 1, wherein the at least some of the locations of the modules comprises three locations of the modules, and wherein the location of the object comprises a unique location.

15. The apparatus according to claim 14, wherein the unique location comprises a unique intersection of three loci of possible locations of the object, and wherein the processing unit is configured to determine the three loci in response to the three locations of the modules.

16. A method for tracking an object, comprising:
   a. disposing a multiplicity of optical radiator modules in an array of known locations adjoining a region in which the object is to move, each module comprising: at least one optical emitter, which is structured to emit optical radiation of a respective color, selected from among a first plurality of colors emittable by the modules, and a controller, which is coupled to drive the at least one optical emitter to emit the optical radiation during a respective time slot, selected from among a second plurality of time slots during which the modules may emit the optical radiation, such that the respective color and the respective time slot form a unique combination for each of the modules;
   b. fixing an optical location unit comprising at least one camera to the object;
   c. capturing from the at least one camera a sequence of electronic images containing at least some of the locations of the modules; and,
   d. processing the electronic images in the sequence in order to determine, responsively to the colors of the optical radiation emitted by the modules and the time slots in which the optical radiation is emitted, a location of the object.

17. The method according to claim 16, wherein the location of the object comprises a locus of possible locations of the object, and determining the location of the object comprises determining the locus in response to the at least some locations of the modules.

18. The method according to claim 16, wherein the at least some of the locations of the modules comprises two locations of the modules, and comprising applying one or more limiting regions for the object so as to determine the location of the object as a unique location.

19. The method according to claim 16, wherein the optical location unit comprises a microprocessor which performs an initial processing of the sequence of electronic images so as to determine pixel coordinates of the at least some locations of the modules, and wherein processing the electronic images comprises processing the pixel coordinates to determine the location of the object.

20. The method according to claim 16, wherein for each module, the at least one optical emitter comprises at least first and second optical emitters of different, first and second colors, and wherein the controller is configurable to select one of the first and second colors to be emitted by the module.

21. The method according to claim 16, wherein the region comprises at least one of a ceiling and at least one wall, and wherein the multiplicity of modules are fixed to at least one of the ceiling and the at least one wall, and are configured to radiate the optical radiation into the region.

22. The method according to claim 16, wherein the at least one optical emitter comprises at least one light-emitting diode (LED).

23. The method according to claims 16, wherein processing the electronic images comprises creating a tracking database in a memory containing records of the location of the object in the region.

24. The method according to claim 16, wherein fixing the optical location unit to the object comprises fixing the unit so that the at least one camera is in a predetermined direction on capturing the sequence of electronic images.

25. The method according to claim 16, further comprising transmitting signals to the optical radiator modules which determine the respective color and the respective time slot of each of the modules, and which synchronize the time slots.

26. The method according to claim 25, and comprising transmitting the signals to the optical location unit so as to synchronize the time slots with the sequence of electronic images.

27. The method according to claim 25, wherein the signals comprise a radio frequency (RF) signal.

28. The method according to claim 25, wherein the signals comprise a Global Positioning System (GPS) synchronization beacon.

29. The method according to claim 16, wherein the at least some of the locations of the modules comprises three locations of the modules, and wherein the location of the object comprises a unique location.

30. The method according to claim 29, wherein the unique location comprises a unique intersection of three loci of possible locations of the object, and comprising determining the three loci in response to the three locations of the modules.

* * * * *